Feb. 20, 1962      A. W. LAPINS      3,021,907
GROUND WORKING IMPLEMENT

Filed Nov. 10, 1958      4 Sheets-Sheet 1

INVENTOR.
ALVIN W. LAPINS
BY
ATTORNEYS.

INVENTOR.
ALVIN W. LAPINS
BY
Carlson, Pitzner, Hubbard & Wolfe
ATTORNEYS.

Feb. 20, 1962 A. W. LAPINS 3,021,907
GROUND WORKING IMPLEMENT
Filed Nov. 10, 1958 4 Sheets-Sheet 3

INVENTOR.
ALVIN W. LAPINS
BY
ATTORNEYS.

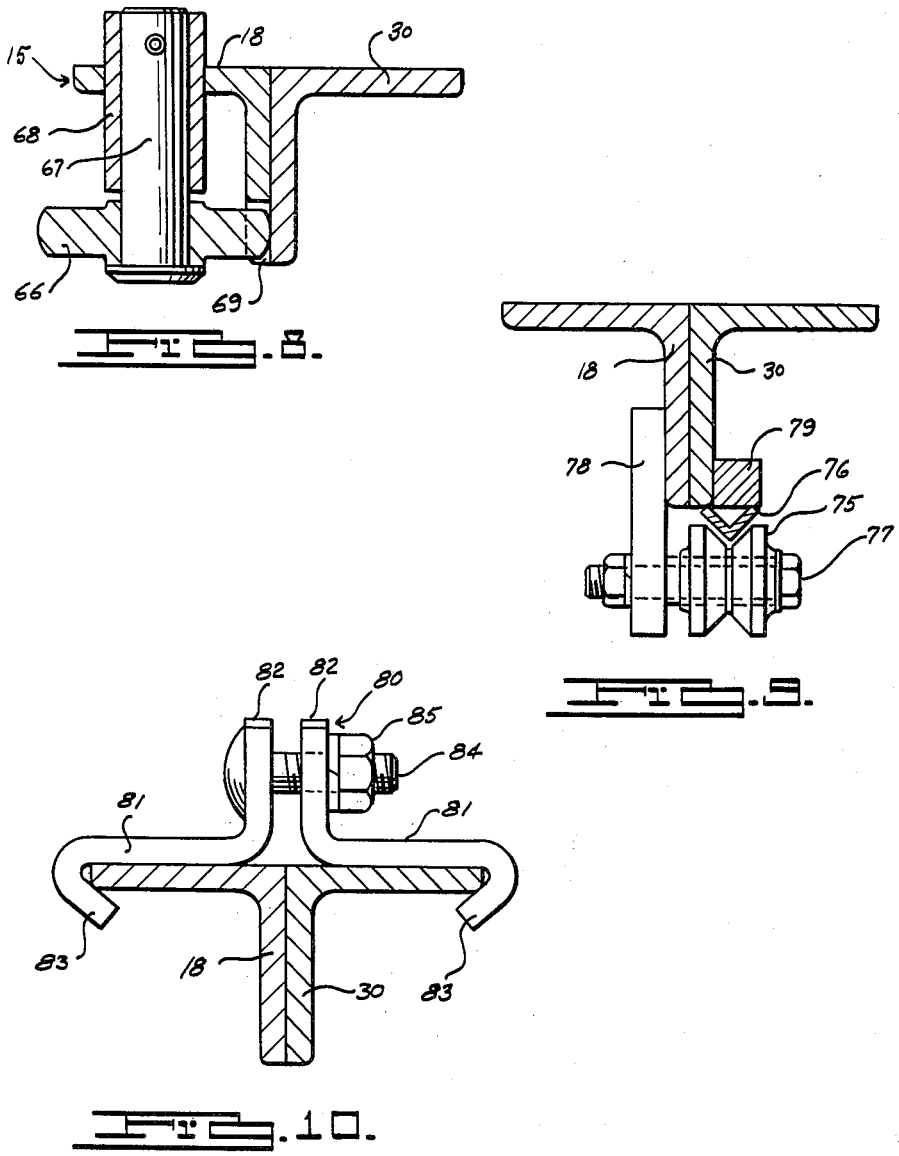

United States Patent Office 3,021,907
Patented Feb. 20, 1962

3,021,907
GROUND WORKING IMPLEMENT
Alvin William Lapins, Fresno, Calif., assignor to Massey-Ferguson Inc., Racine, Wis., a corporation of Maryland
Filed Nov. 10, 1958, Ser. No. 773,015
3 Claims. (Cl. 172—441)

The invention relates to ground working implements adapted for use with tractors and more particularly, implements having a plurality of operating units or sections arranged in tandem.

One object of the invention is to provide a sectional implement of the above general character embodying novel features of construction which materially increase its range of adjustability with respect to operation of the sections directly behind or offset to one side or the other of the tractor.

Another object is to provide a sectional implement in which the sections can be adjusted independently or the entire implement adjusted as a unit for operating directly behind or in laterally offset relation to the tractor.

Still another object is to provide novel coupling means for a sectional implement of the above type which enables the adjustment to be made very easily and quickly by one man.

A more specific object is to provide a tractor drawn ground working implement in which the units or sections can be adjusted laterally relative to each other or relative to the tractor by simply moving the implement either forwardly or rearwardly.

Other objects and advantages of the invention will become apparent from the following detailed description of the preferred embodiment illustrated in the accompanying drawings in which:

FIGURE 1 is a perspective view of a ground working implement embodying the features of the invention, the implement being shown coupled to a tractor.

FIGS. 2, 3, and 4 are partly diagrammatic top views showing the implement in different adjusted positions.

FIG. 8 is a fragmentary sectional view on an enlarged scale taken in a plane substantially on the line 8—8 of FIG. 4.

FIG. 9 is a fragmentary sectional view on an enlarged scale taken in a plane substantially on the line 9—9 of FIG. 3.

FIG. 10 is a fragmentary sectional view on an enlarged scale taken in a plane substantially on the line 10—10 of FIG. 2.

While a single preferred embodiment of the invention has been shown and will be described herein, there is no intention to limit the invention to the particular form illustrated. The intention is to cover all modifications and adaptations falling within the spirit and scope of the invention as more broadly or generally characterized in the appended claims.

By way of illustration the invention has been shown as embodied in an implement 11 in which the general working elements comprise metal discs supported for rotation on axes dispersed generally transverse to the line of travel of the implement. Such implements or disc harrows as they are usually called are produced in a number of different forms for specific jobs to be done. The particular harrow shown is of the type commonly known as an "offset" disc harrow extensively used in the cultivation of orchards, vineyards and the like. It is designed for use with tractors equipped with a trailing three element hitch linkage such as the "Ferguson" tractor.

Figure 1:
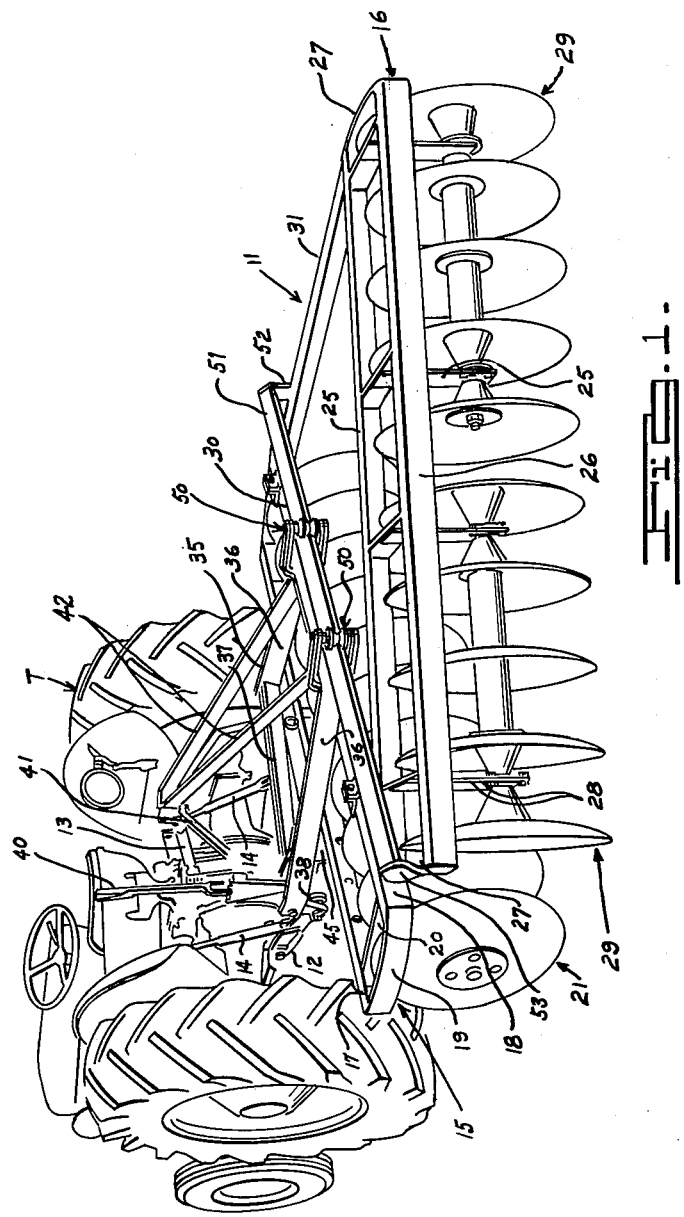

A tractor T of that type is shown in FIG. 1. Its hitch linkage includes a pair of laterally spaced lower or draft links 12 and an upper or control link 13. The latter act in well-known manner to control the hydraulic system incorporated in the tractor to raise or lower the linkage and attached implement through connections provided by drop links 14 with the draft links.

The exemplary harrow comprises front and rear units or sections 15 and 16. The front section 15 has a rectangular frame comprising front and rear angular members 17 and 18 joined at opposite ends by rigid end members 19. Cross members extending between the members 17 and 18 carry depending bearing supports 20 (FIG. 2) for journalling a pair of axially alined disc gangs 21 which may be of conventional construction. As shown in FIG. 1, the discs of the gangs 21 have their concave sides facing to the right.

The rear unit or section 16 also includes a rectangular frame comprising front and rear angle members 25 and 26 rigidly connected by end members 27. Cross members extending between the front and rear frame members carry depending bearing supports 28 journalling a pair of conventional axially alined disc gangs 29. The discs of the gangs 29 are faced opposite to the front gangs, that is, to the left of the tractor in the particular implement shown.

For properly orienting the rear section 16 with respect to the front section 15 and to provide for coupling the sections together, the rear section is equipped with a transverse bar 30 disposed at an angle to the axis of the frame and spaced forwardly therefrom for abutting engagement with the rear frame member 18 of the front section 15. As herein shown, the bar 30 is an angle bar having one end secured as by welding to the end of the front frame member 25 of the section 16, in this instance, to the left end of the frame member. The other end of the bar 30 is secured to the frame of the section by an elongated strut 31 welded or otherwise rigidly attached to the bar and the frame. To provide the required strength and rigidity without excessive weight, the strut 31 may conveniently comprise a hollow or tubular bar structure of rectangular cross section.

In accordance with one aspect of the invention, the implement sections 15 and 16 are coupled to the tractor by a novel hitch or coupling frame structure 35 which permits quick and easy lateral adjustment of the sections relative to each other and relative to the tractor either individually or as a unit. In its preferred form, the frame 35 comprises a pair of spaced parallel side bars 36 connected at their front and rear ends by cross bars 37. Adjacent their forward ends the side bars carry depending arms 38 fitted with suitable pins for connection with the draft links 12 of the tractor. At least one of the arms 38 is pivoted to swing fore and aft to adjust the angle of attack of the implement. Means including a hand lever 40 is provided for adjusting the position of the pivoted arm, the lever being provided with suitable locking means for retaining the arm in adjusted positions.

Also provided at the front end of the coupling frame is an upstanding A-frame 41 having suitably spaced apertures at its upper end by which it may be connected by a pin with the top link 13 of the hitch linkage. Brace bars 42 extending between the A-frame and the side bars 36 hold the frame rigid.

For connection with the front unit or section 15 the coupling frame includes a depending angle bar 45 (FIGS. 1 and 5) defining a transverse abutment for cooperation with the front frame member 17 of that section. By reference to FIG. 2, it will be noted that the angle bar 45 is positioned on the coupling frame so that it positions the axis of the front disc gangs 20 at an angle to the center line of the tractor. In other words, it provides a predetermined line of attack for the front gang. The positioning of the transverse bar 30 locates the axis of the rear gangs 29 in substantially the opposite angular relation to the tractor center line.

Figure 5:
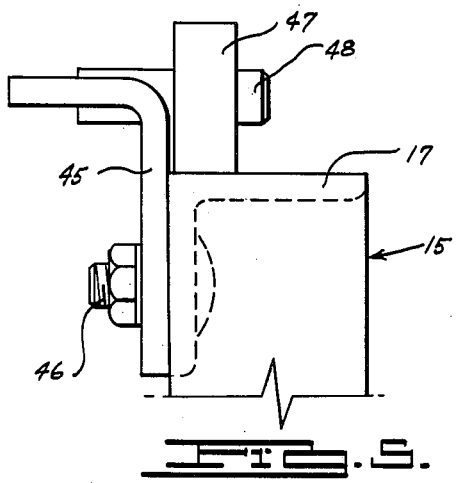
FIG. 5 is a fragmentary sectional view on an enlarged scale taken in a plane substantially on the line 5—5 of FIG. 2.

In the operation of the implement the front frame member 17 and the angle bar 45 are rigidly secured together by bolts 46 as shown in FIG. 5 inserted through alined holes in the respective parts. Preferably both bars are provided with a series of holes for securing the frame to the angle bar in a plurality of different lateral positions. To effect lateral adjustment of the implement section, the bolts are removed to allow relative sliding movement between the frame member and the angle bar.

Provision is made for retaining the front frame section in alinement with the angle bar 45 upon removal of the bolts 46 and for facilitating the relative sliding movements between the bar and frame. For this purpose the angle bar carries a series of rollers 47 positioned as shown in FIG. 5 to engage the upper flange of the front frame member 17. In the exemplary implement the rollers are journalled on studs 48 fitted into notches in the angle bar and welded or otherwise rigidly secured to that bar.

To avoid imposing excessive strains on the frame of the front section 15, a connection is provided between the coupling frame and the rear section 16 of the implement for the transmission of the major portion of the draft forces involved in the operation of the implement. In accordance with the invention, the connection is constructed and arranged to permit quick and easy adjustment of the rear section relative to the front section and means is provided for securely locking the sections together in adjusted positions. For this purpose the hitch frame is provided with a pair of roller coupling assemblies 50 (FIG. 6) spaced apart laterally of the coupling frame and extending rearwardly therefrom for cooperation with a transverse bar 51 rigidly secured to the implement section 16.

Figure 6:
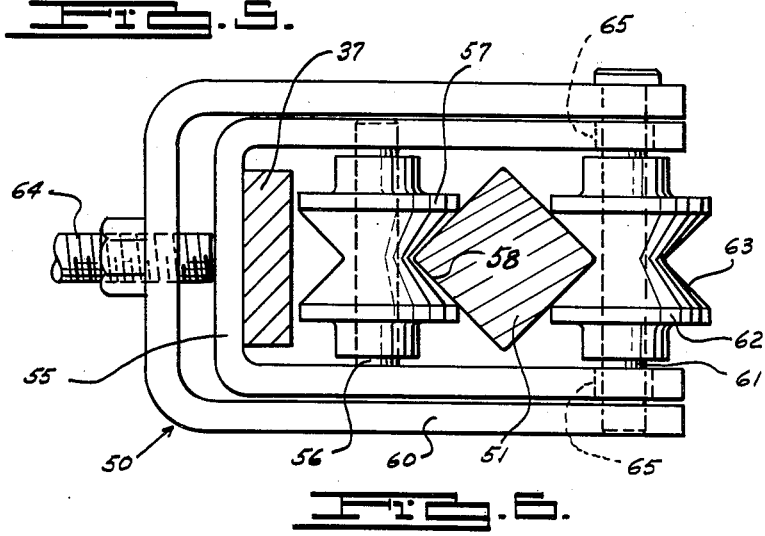
FIG. 6 is a fragmentary sectional view on an enlarged scale taken in a plane substantially on the line 6—6 of FIG. 3.

As shown in FIGS. 1 and 6, the bar 51 is square in cross section and is mounted with its four corners disposed respectively in vertical and horizontal planes. It is supported rearwardly of and parallel to the transverse frame bar 30 and in a plane slightly above the plane of the latter bar. Support is provided in this instance by brackets 52 and 53 welded or otherwise attached to opposite ends of the bar 51 and respectively secured as by welding to the strut 31 and to the end member 27 of the rear section frame.

The coupling assemblies 50 are alike, each comprising a heavy metal yoke 55 adapted to straddle the cross member 37 of the hitch frame with its legs spaced apart vertically and projecting rearwardly of the cross member. The bight portion of the yoke may be welded or otherwise rigidly secured to the cross member 37. A shaft 56 supported by the legs of the yoke rotatably supports a roller 57 complemental to the section of the bar 51 with which it is intended to cooperate. Thus, in the exemplary embodiment the roller 57 is formed with a V-shaped groove 58 dimensioned to receive corners of the bar 51.

Straddling and enclosing the yoke 55 is a second yoke 60 having its legs extending along the outer face of the legs of the inner yoke. The outer yoke carries a pin 61 rotatably supporting a roller 62 having a V-shaped groove 63 similar to the groove 58 in the companion roller. The roller supporting pins 56 and 61 are spaced apart to position the respective rollers 57 and 62 on opposite sides of the bar 51 as shown in FIG. 6.

Provision is made for shifting the outer yoke relative to the inner yoke in a direction to clamp the rollers 57 and 62 firmly against the bar 51. As shown in FIG. 6, clamping is effected by an adjusting screw or bolt 64 inserted through a threaded hole in the bight of the outer yoke and adapted to bear on the corresponding portion of the inner yoke. Thus, by screwing the adjusting bolt inwardly the outer yoke is drawn in a direction to carry the roller 62 toward the roller 57. To accommodate such movement the legs of the inner yoke are slotted as at 65 to afford clearance for the shaft 61.

To reduce friction in the relative movements of the front and rear sections of the implement, suitable bearing rollers are provided for engagement with the adjacent members of the frames. As shown in FIG. 8, the rear frame member 18 of the front section 15 carries a series of rollers 66 positioned to supportingly engage the front frame member 30 of the rear section 16. Each of the rollers 66 is rotatably supported on a headed pin 67 seated in a tubular oscket 68 welded or otherwise secured to the horizontal flange of the angle bar constituting the member 18. The roller is thus supported for rotation about a vertical axis with its peripheral edge projecting through a notch 69 in the vertical flange of the angle bar 18 to engage the vertical flange of the angle bar 30 constituting the front member of the rear frame.

Figure 7:
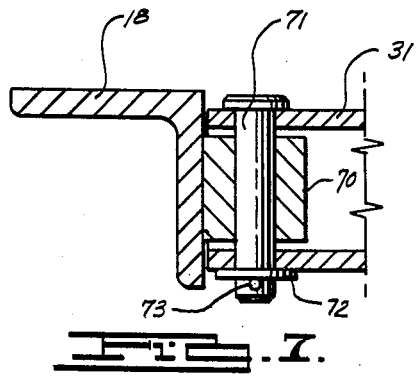
FIG. 7 is a fragmentary sectional view on an enlarged scale taken in a plane substantially on the line 7—7 of FIG. 4.

The frame of the rear section 16 may also be fitted with guide rollers 70 adapted to engage the vertical flange of the angle bar 18 as shown in FIG. 7. The rollers 70 in this instance are journalled on headed pins 71 inserted through alined apertures in the upper and lower walls of the strut 31. A washer 72 and cotter pin 73 at the lower end of each pin retains the parts in assembled relation. A similarly mounted roller may be provided adjacent the other end of the frame and at intermediate positions, also, if desired.

Vertical support is provided for the rear section 16 in its adjusting movements by a series of rollers 75 (FIG. 9) supported on the frame member 18 in position to cooperate with a downwardly facing rail 76 on the rear frame. In the exemplary implement the rollers 75 are journalled on headed studs 77 carried by brackets 78 welded to and depending from the vertical flange of the frame member 18. The rail 76 may conveniently comprise an angle bar welded to the lower edge of the frame member 30 and to a support bar 79 also welded to the member 30. As will be seen by reference to the drawing, the rail 76 is mounted with its apex facing downwardly and the rollers 75 are complementally grooved to receive the rail.

In operation the front and rear implement sections are rigidly secured together by suitable clamping devices 80. As shown in FIG. 10, each clamping device preferably comprises a pair of L-shaped members 81 assembled with their shorter legs 82 in face-to-face relation. The longer legs of the members are bent back to define hook elements 83 adapted to engage over the horizontal flanges of the frame members 18 and 30. A bolt 85, inserted thereon, aligning holes in the legs 82 and fitted with a nut 85 serves to draw the hook members inwardly and thus clamp the frame members together to form a rigid unitary structure.

The ease of adjustment afforded by the novel construction and assembly of the two disc carrying units of the sections particularly adapts the implement for one-man operation around orchards, vineyards and other places where it is frequently necessary to change the position of one or both gangs relative to the tractor to reach otherwise inaccessible areas. Disc harrows are inherently heavy and cumbersome implements, yet the novel provision for adjustment of the front and rear sections individually or as a unit allows one man to make any desired adjustment quickly and with a minimum of physical effort.

By way of example, the implement may be adjusted laterally as a unit by simply removing the bolts 46 connecting the front frame 15 with the angle bar 45 of the hitch frame. By driving the tractor in a forward direction the angular disposition of the transverse bar 51 relative to the line of travel shifts the entire implement laterally toward the left. Rearward movement of the tractor shifts the implement in the opposite direction, that is, to the right.

During such adjusting movements, the implement sections 15 and 16 are held together as a unit by the clamp devices 80 and the unit is retained in proper relation to the hitch frame by the roller coupling assemblies 50 engaged in the transverse bar 51. The front portion of the unit is retained in alinement with the hitch frame by the rollers 47 cooperating with the front frame member 17 of the section 15.

When the implement is in its desired adjusted position, the bolts 46 are replaced to lock it securely relative to the hitch frame. It will be understood that a number of holes are provided in the frame member 17 and angle bar 45 to accommodate positioning the front frame member at the extreme left of the tractor or at the extreme right, the later position being shown in FIG. 4. The holes for the bolts 46 may be easily lined up for insertion of the bolts by a slight forward or rearward movement of the tractor and implement.

Lateral adjustment of the rear section 16 relative to the front section can be effected just as quickly and easily as the unitary adjustment above described. For individual adjustment of the rear section 16 the front section remains locked to the hitch frame. The clamp devices 80 are released to free the frame 16 by backing up the nuts 85 on the bolts 84. The rear frame is then supported and guided for lateral movement between the roller assembly 57 and 62 engaging the bar 51. The rollers 75 engage the rail 76 to provide vertical support for the sections. Frictional resistance between the adjacent frame members is reduced to a minimum by the rollers 66 and 70 interposed between the members.

With the clamp devices released, forward movement of the tractor and implement will shift the rear section of the implement to the left while rearward movement of the tractor will shift the section to the right.

Figure 2:
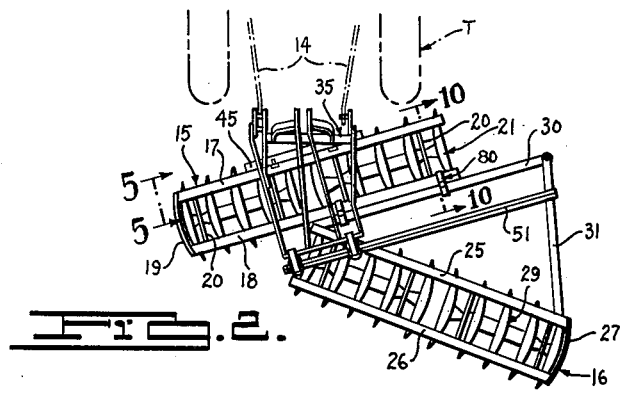
Figure 4:
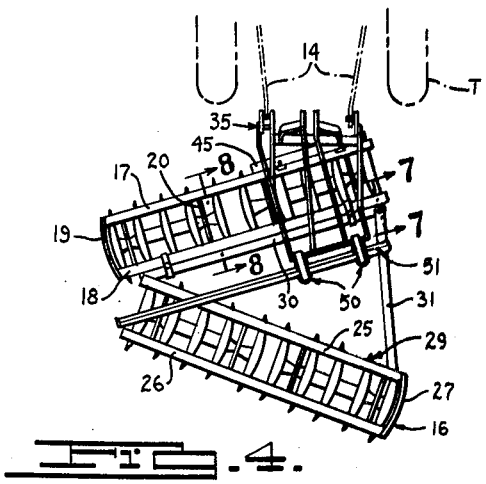

It will be evident from the foregoing that with the arrangement described the implement units may be adjusted relative to the tractor and to each other to provide efficient performance under a wide variety of operating conditions. Thus, the two implement sections may be lined up as shown in FIG. 4 and operated directly behind the tractor similar to a conventional disc harrow. When it is desired to reach an area to the right of the tractor which for any reason is not adapted to accommodate the tractor itself, the rear section may be shifted rightward relative to the front section as shown in FIG. 2. Thus, the front section remains directly behind the tractor while the rear section is offset to reach out to the right of the tractor. If still greater reach is required, the entire unit may be adjusted to the right relative to the tractor as previously explained.

Figure 3:
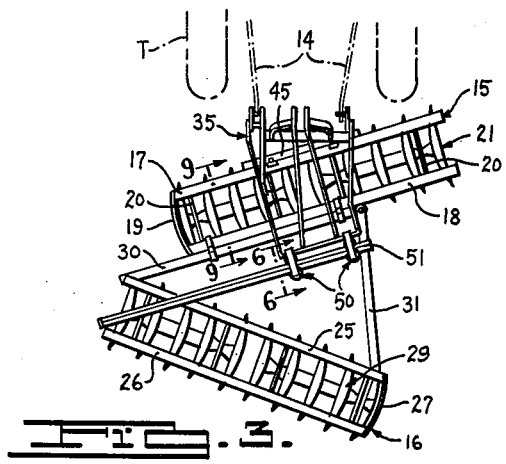

Alternatively, the rear section may be adjusted to the left of the front section as shown in FIG. 3 to reach out into otherwise inaccessible areas at the left of the tractor. A still farther offset may be obtained by adjusting the implement sections as a unit leftward from the positions shown in FIG. 3.

It will be evident that the improved implement is extremely versatile with respect to its ability to work areas into which the tractor cannot be driven. Adjustments to adapt it for working such areas are quickly and easily made by one man despite the heavy cumbersome character of the implement. These advantages are attained without unduly complicating the implement construction and a sturdy, efficient and practical implement is obtained.

I claim as my invention:

1. In a groundworking implement having front and rear sections, in combination, means securing said sections together as a unit, a hitch frame extending over the front section and having means adjacent its forward end for coupling with the hitch linkage of a tractor, means releasably connecting said hitch frame to the front section, means for coupling said hitch frame to the rear section including a transverse bar mounted on and at an angle to said rear section, and a pair of coupling elements mounted on and spaced laterally of the hitch frame cooperating with said bar for supporting and guiding the coupled sections for lateral movement as a unit relative to the hitch frame upon release of the means connecting said front section to the hitch frame.

2. In a ground working implement having front and rear sections, in combination, releasable clamping means securing said sections together as a unit, a hitch frame extending over the front section and having means adjacent its forward end for coupling with the hitch linkage of a tractor, coupling means connecting the rear section to said hitch frame, said coupling means including an elongated bar mounted on and extending generally transversely across and at an angle to the rear section, and laterally spaced coupling elements mounted on the hitch frame engageable with said bar for supporting and guiding the clamped sections for movement as a unit laterally toward either side of the hitch frame and for supporting and guiding the rear section for lateral movement relative to the front section upon release of said clamping means.

3. In an offset type disc harrow, the combination of a front frame section carrying an axially alined set of discs, a rear frame section carrying a similarly axially alined set of discs, means co-acting with said frames for clamping them together as a unit with their respective disc axis oppositely inclined to the line of draft of the harrow, said clamping means being releasable to permit lateral shifting of one frame relative to the other, a hitch frame extending over the front frame section having means adjacent its forward end for coupling with the hitch linkage of a tractor, means adjustably coupling the hitch frame to one of the frame sections including a track assembly extending generally laterally of and at an angle to the rear section of the harrow, a roller truck assembly engaging said track and movable thereon, one of said assemblies being mounted on said one frame section and the other being mounted on said hitch frame and co-acting to form a connecting attachment whereby the lateral position of said clamped sections may be changed with respect to the hitch frame by movement of the harrow forwardly or rearwardly, and cooperating means engageable to lock the truck and track assemblies in various laterally adjusted positions.

References Cited in the file of this patent

UNITED STATES PATENTS

| | | |
|---|---|---|
| 338,982 | La Dow | Mar. 30, 1886 |
| 542,339 | Jones | July 9, 1895 |
| 2,440,550 | Martin | Apr. 27, 1948 |
| 2,575,622 | Fraga | Nov. 20, 1951 |
| 2,583,830 | Goble | Jan. 29, 1952 |
| 2,713,297 | Tsuchiyz | July 19, 1955 |
| 2,759,313 | Campbell | Aug. 21, 1956 |